July 24, 1956  A. FREEMAN  2,755,914
CHAIN CONVEYORS

Filed Jan. 2, 1953  3 Sheets-Sheet 1

INVENTOR
Alfred Freeman
BY
Jerome W. Payton

July 24, 1956 A. FREEMAN 2,755,914
CHAIN CONVEYORS

Filed Jan. 2, 1953 3 Sheets-Sheet 3

INVENTOR
Alfred Freeman
BY

United States Patent Office 2,755,914
Patented July 24, 1956

2,755,914
CHAIN CONVEYORS

Alfred Freeman, Isham, near Kettering, England

Application January 2, 1953, Serial No. 329,340

10 Claims. (Cl. 198—177)

The present invention relates to conveyors and is particularly concerned with those of the chain link type, endless or otherwise, for transporting goods, work, and so on.

An object of the invention is to furnish a link for use in a conveyor chain of improved utility for reasons such as will hereinafter be referred to.

A further object is a link comprising a body with an elongated opening extending in the direction of intended movement of the link in use, this body carrying at least one roller, wheel, or equivalent runner formed to engage and run on the upper edge of a supporting and guiding trackway, and carrying a laterally-extending, headed element adapted to engage in the elongated opening in a next-adjacent link so as to provide for movement of the inter-engaged links in tandem but for a degree of lost motion between them.

The invention also includes a conveyor chain made up from links as set forth, and other features which will be hereinafter disclosed.

Preferred embodiments of a conveyor chain, and links therefor, according to the invention will now be described, by way of illustration, with reference to the accompanying drawings, in which Figure 1 is a perspective view of two links of a conveyor chain according to the present invention indicated as mounted on a bar trackway.

Figure 1:
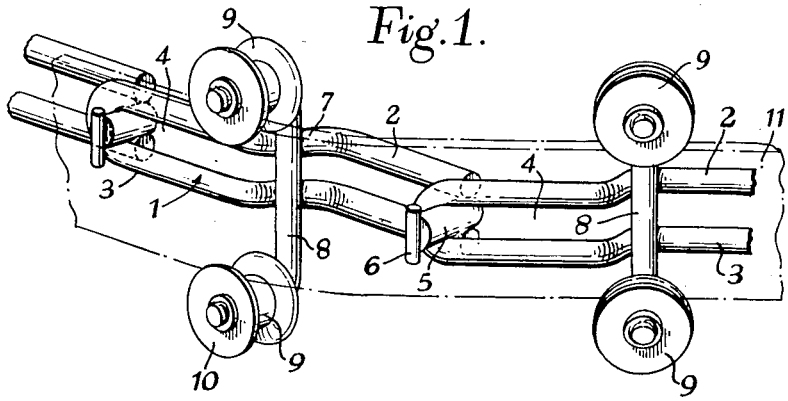
Figure 2:
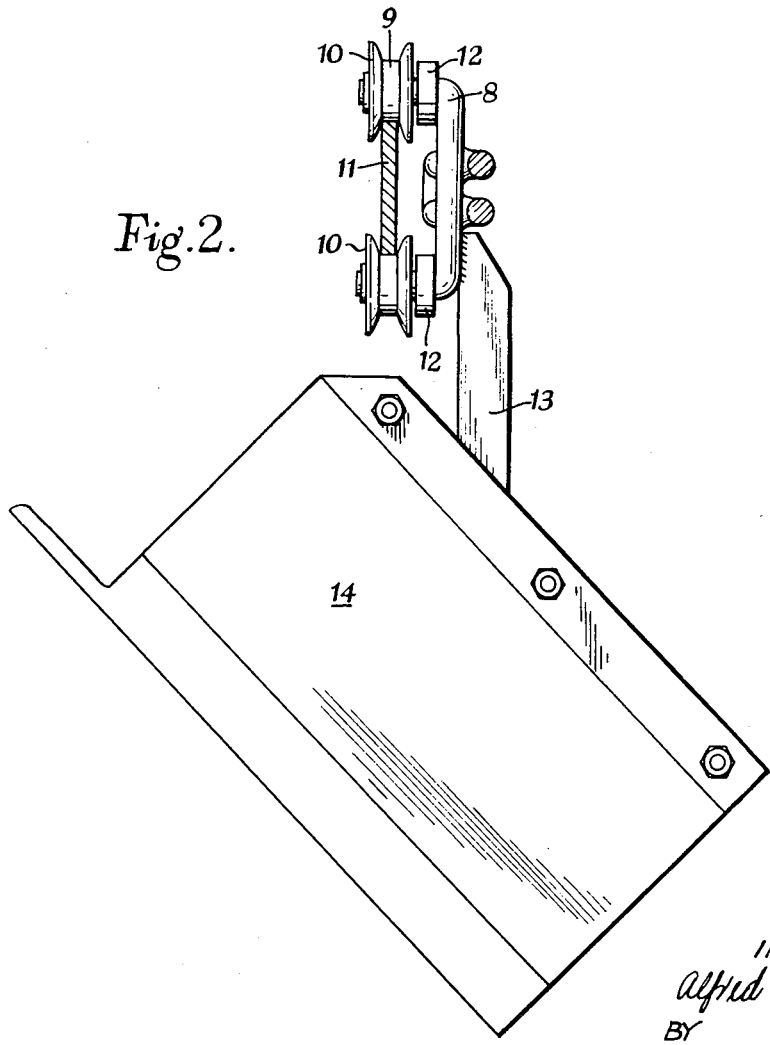
Figure 2 is a cross sectional view through a conveyor substantially of the form indicated in Figure 1, but illustrating the addition of a carrier to one of the links.

The simpler form of link illustrated in Figures 1 and 2 comprises a body 1 of rod which is bent into parallel-sided hair pin shape so that the two limbs 2 and 3 define between them an elongated opening 4 at one end. At the opposite end of the link, the limbs 2 and 3 have secured between them a laterally-projecting coupling element comprising a stem 5 and a head 6. As will be observed from Figure 1, the stem 5 passes, when the conveyor is assembled, through the opening 4 in the next adjacent link, so as to couple the two links in tandem, but to allow relative longitudinal movement between them. The stem 5 is rotatable in opening 4.

As will also be noted, the stem 5 is of greater length than the thickness of limbs 2 and 3, whilst the head 6 is of greater length than the distance between these limbs, i. e. the width of the opening 4, but is of substantially smaller width than this, whereby the two links can be coupled together when the chain is assembled by turning one link relatively to the other to allow admission of the head 6 through opening 4. This arrangement, in combination with the lost-motion coupling, also provides for rapid replacement of links in an assembled chain without dismantling the latter.

About midway between its ends, the body 1 of the link is cranked as at 7 and at this part has welded, across the limbs 2 and 3, a transverse piece 8 formed of rod and having its ends bent to extend laterally outwards from the body. Loosely mounted on each of these ends is a runner wheel 9 having side flanges 10, these wheels being adapted, in use, to run along the upper and lower edges respectively of a bar 11 forming the supporting and guiding trackway of the conveyor. The runners or wheels 9 are loosely mounted on the out-turned ends of the transverse piece 8 and, as will be seen from Figure 2, a loose collar 12 is provided to limit the play of each wheel 9 on its supporting arm.

In the instance illustrated, the trackway bar 11 is arranged so that the wheels are in vertical alignment, but it is to be understood that the trackway can be otherwise disposed, as will appear from embodiments to be hereinafter described.

Moreover, a conveyor chain made up of links as illustrated is adapted for a considerable degree of flexibility in the chain without strain or distortion. Hence, for example, the provision for relative movement or lost motion between adjacent links allows for different rates of movement in parts of the conveyor chain, due for example to the temporary stoppage of any one part of the conveyor, slowing-up of parts thereof at corners, or the over-driving of one part relatively to another, without interference with the general operation of the chain. In addition, the relative dimensioning of the stem 5 and the thickness of the limbs 2 and 3, and the loose mounting of the runners 9 allow the chain to traverse bends, as indicated for example by the form of bar 11 in Figure 1. Furthermore, the conveyor can also follow a vertical rise or descent, e. g. to a work bench or machine in a series-production system in view of the coupling between the headed element 5—6 and the next adjacent link.

Conveyors as described are capable of numerous applications, one example of which is the system described in co-pending application Serial No. 294,400, in which event certain of the links may additionally have welded to the transverse piece 8 thereof a depending bar 13 suspending a last carrier 14 as indicated in Figure 2. It will be understood that the chain could, instead, be provided or equipped in numerous other ways to carry out a transporting function, by using mounting pins, suspended hooks, lateral bearing arms, and so on.

Figure 3:
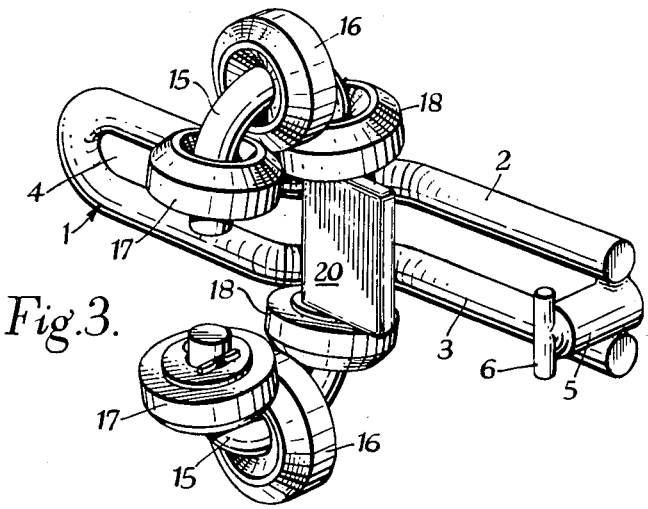
Figure 3 is a perspective view of a modified form of a conveyor link.
Figure 4:
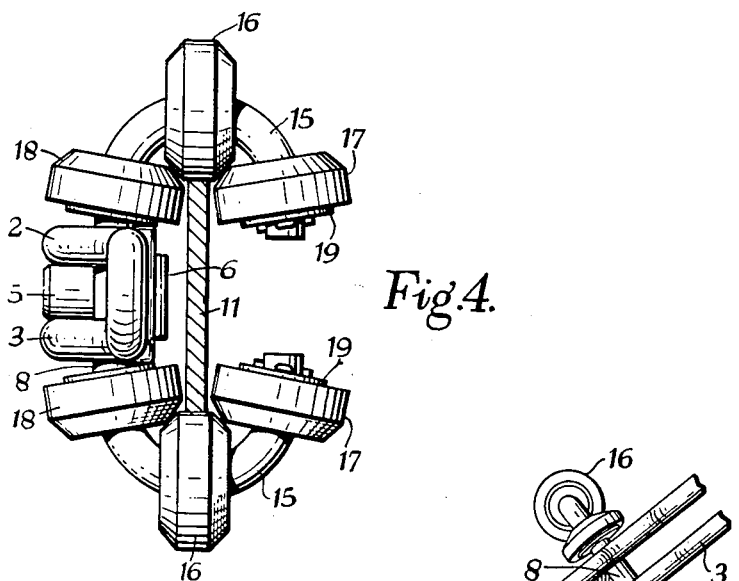
Figure 4 is an end view of the link of Figure 3, indicating the mounting of the same on a vertically-disposed bar trackway.
Figure 5:
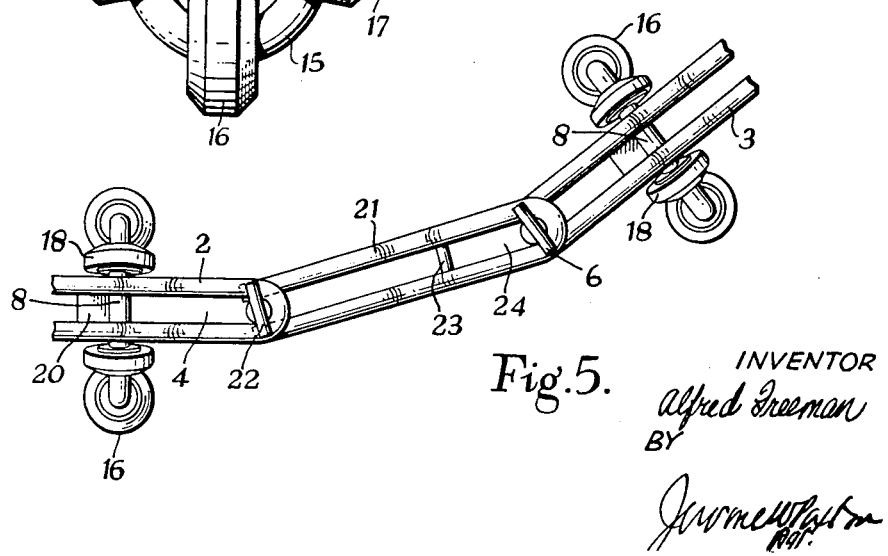
Figure 5 is a perspective illustration of the coupling of two links of the embodiments of Figures 3 and 4 by means of an auxiliary link.

The modified form of link illustrated in Figures 3 to 5 is similar in many respects to that already described, and equivalent parts are therefore designated with the same reference numerals. It is to be noted that here the cross piece 8 has its ends 15 curved around to one side in semi-circular fashion and has three rollers loosely mounted on each of these curved ends. The middle roller 16 of each set is adapted to run on the upper or lower edge, respectively, of the trackway bar 11, again shown in Figure 4 with its main plane vertically-disposed, whilst the outer rollers 17 and 18 of the set are adapted to run along the outer and inner sides respectively of this bar. The outer rollers 17 cooperate with a washer 19 to limit their outer movement along the corresponding end 15, the corresponding movement of the rollers 18 being stopped by a plate 20 secured to the vertical portion of transverse piece 8. The use of the two sets of three rollers 16—18 not only provides for a more positive guidance of the links on conveyor bar 11, but also facilitates "cornering" or deflection of the chain in the horizontal and vertical planes, and allows for twisting of the bar, where this may be required for any purpose, whilst still maintaining the link supported and positively guided.

A chain made up of links as illustrated in Figures 3 and 4 can be equipped with various forms of attachment or mounting devices, e. g. of the kind illustrated in Figure 2, for the conveyance of work or other goods.

In some instances it has been found possible to use a form of auxiliary link, in either of the two embodiments herein particularly described, disposed between two runner-provided links. An auxiliary link of this character is illustrated in Figure 5 as used to couple together links as in Figures 3 and 4, and is designated 21, comprising a parallel-sided hairpin body of closed loop form similar to that of the body of the main links, i. e. cranked along its length and having a headed element 22 at one end. This auxiliary link is provided with a cross piece 23 defining an elongated opening 24, similar to the opening 4 of the main links, for the lost motion coupling.

Figure 6:
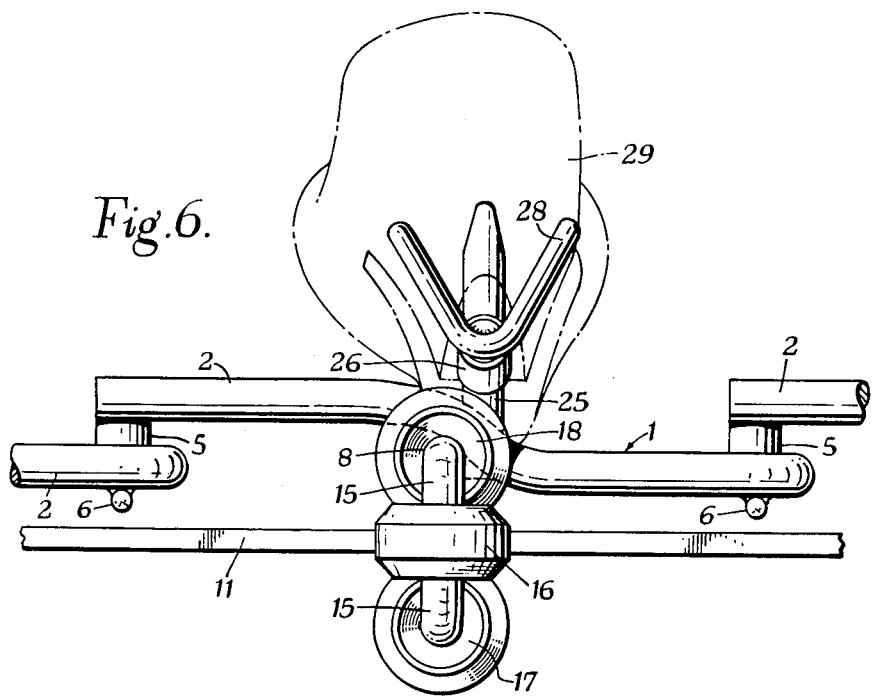
Figure 6 is a side view of another chain link similar to that of Figures 3 to 5, but disposed to run on a horizontally-disposed trackway bar, and with an added carrier means.

Finally, Figures 5 and 6 illustrate the use of a roller-provided link similar to that of Figures 3 to 5 with a trackway bar 11 which is disposed with its width horizontal. In this arrangement the rollers 18 transmit the conveyor load to the trackway, whilst the rollers 16 serve as lateral guides. However, any rise, descent or twist in the trackway will also be taken care of by the various rollers.

In addition these figures illustrate the application of a link conveyor chain to the carrying of footwear lasts. To this end, in the link illustrated the plate 20 is omitted and there is welded to one side of the transverse piece 8, and the adjacent links 2 and 3 of the loop body, an outstanding jack pin 25 which is chamfered at its upper end 26. Extending rearwardly from pin 25 is a section 27 of cylindrical rod having a V-form metal bracket or crook 28 welded to its outer end.

Figure 7:
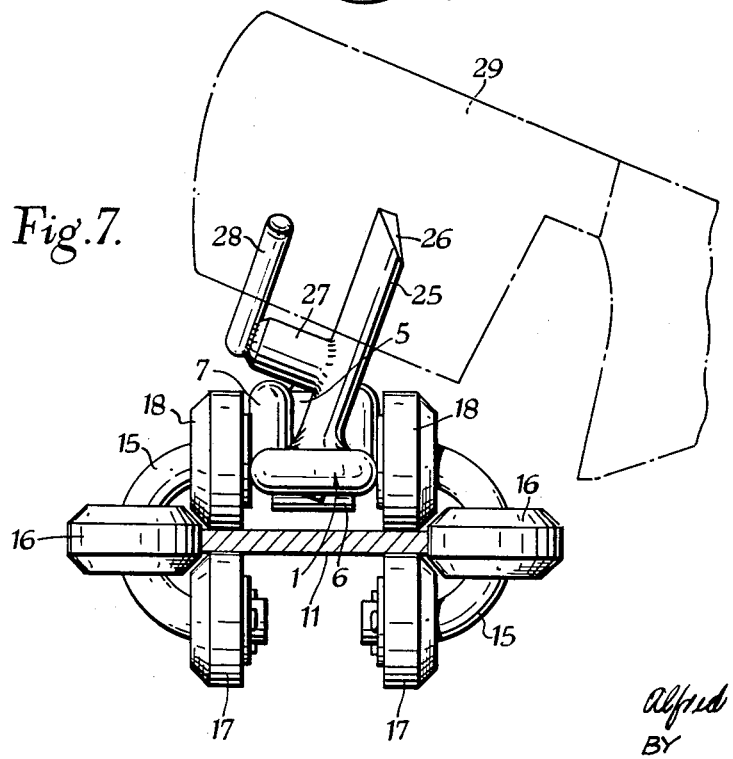
Figure 7 is an end view corresponding to Figure 6.

In use a last, having the conventional heel socket for this purpose, is fitted on the pin 25 so as to extend forwards at a small inclination, and the flanks of the last heel are lodged between the limbs of bracket 28, forming a stable support of the character described in my U. S. Patent No. 2,466,406 dated March 8, 1949. Such a last is indicated at 29 in Figures 6 and 7.

Thus the conveyor chain, which for example will only have pin-provided links of this form interpolated along its length, can be used to convey the lasts with a footwear component thereon along the circuit, as between operating stations, through a drying zone, or to an unloading point. Similarly, empty lasts can be forwarded to a required sorting or delivery location by this means. Again, the particular disposition of the lasts on the pin will enable actual performance of work on the shoe, or embry shoe, during the conveyance.

Moreover, although in the particular example illustrated, the splayed limbs of the bracket 28 are disposed to one side of the longitudinal direction of the link concerned, i. e. of the direction of the conveyor run at this part, it is to be understood that they could be otherwise positioned in relation to the jack pin 25. For example, the bracket could be located behind the jack pin in the longitudinal direction of the link, in which case, the length of the last would follow the direction of travel of the conveyor, instead of being transverse to this direction as in the illustrated case.

Although, in the particular embodiments described, the chain is intended to run along a bar-form trackway, it will be appreciated that it could be used with other forms of rail or, with modifications, be guided, suspended, or run, on other forms of track.

It will also be apparent that the amount of flexibility of the chain can be varied according to requirements by the interpolation of a greater or lesser number of links with the lost-motion coupling as above set forth. Furthermore it is to be observed that in all cases, the narrow width of the body 1 of the link, i. e. the overall width of the limbs 2 and 3, is such as to preclude any fouling of the wheels or runners by these limbs when the chain "telescopes." In some instances, in fact, the bight end of the body of one link will butt up against the cross piece 8 of the next, as at a part of the chain moved forward by a pushing action in contrast to a pull thereon.

What I claim is:

1. For a conveyor chain, a link comprising an elongated body having a longitudinally offset portion between its ends to provide two sections in different planes, said body having therein an opening on one side at least of the longitudinally offset portion, at least one runner disposed on each side of said body for running on a chain-supporting and guiding trackway, and a coupling element at one end part of said body and extending laterally of such body, this element having a stem of greater length than the thickness of said body at the opposite end part of lesser thickness than the length of said opening, and having a head on the outer end of such stem of greater width than the width of said opening.

2. For a conveyor chain, a link comprising an elongated body formed of a length of rod bent parallel-sided, hairpin fashion, said body being longitudinally offset between its ends to provide two sections in parallel planes, a cross piece secured transversely to said body at the longitudinally offset portion and having arms projecting laterally outwards from each side thereof, at least one roller or equivalent rotatably mounted on each laterally projecting arm of said crosspiece, and a coupling element secured to the body at the outer end thereof and extending laterally of such body, this element having a stem of greater length than the thickness of said rod but of smaller thickness than the width of the opening defined between the opposite end of said body, the side limbs of said body, and said crosspiece, and having a head on the outer end of such stem of greater width than this opening.

3. A link as in claim 2, in which each roller or equivalent is loosely mounted for lateral displacement on its bearing arm.

4. A link as in claim 2, in which each lateral arm of the crosspiece is bent off away from the link, and carries a rotatable, flanged wheel.

5. A link as in claim 2, further including a carrying attachment secured to said body at the longitudinally offset portion.

6. For a conveyor chain, a link comprising an elongated body formed of a length of rod bent parallel-sided, hairpin fashion, said body being longitudinally offset between its ends to provide two sections in parallel planes, a cross piece connected transversely to said body at the longitudinally offset portion, a bearing arm extending laterally from each side of said body, each said arm being bent to form a crook with its outer end turned inwards a distance from the said body, three rollers loosely threaded on each bearing arm, one at said inturned outer end, a second on the intermediate bight of said arm, and the third on the inner end portion of the latter and a coupling element secured to the body at the outer end thereof and extending laterally of such body, this element having a stem of greater length than the thickness of said rod but of smaller thickness than the width of the opening between the opposite end of said body, the side limbs of said body, and said cross piece, and having a head on the outer end of such stem of greater width than this opening.

7. A link as in claim 6, further including a jack pin outstanding from said body and secured to the crosspiece and between the side arms of this body, and splayed, last-stabilizing fingers secured on the jack pin at a distance from the latter.

8. A conveyor chain including a plurality of links each having an elongated body longitudinally offset between its ends, lateral runners carried by said body for supporting and guiding the chain on a trackway, and headed means secured to and extending laterally from said body, said head engaging in the adjacent link in said chain to allow relative telescopic movement and relative lateral movement between the coupled links.

9. A conveyor chain as in claim 8, further including carrier devices secured to some at least of the links.

10. A conveyor chain as in claim 8, further including auxiliary links each comprising a hairpin structure longitudinally offset between its ends and having a headed coupling element at its otherwise open end.

References Cited in the file of this patent

UNITED STATES PATENTS

| | | |
|---|---|---|
| 936,917 | Levalley | Oct. 12, 1909 |
| 2,229,002 | Cowey | Jan. 14, 1941 |
| 2,372,199 | Hassler | Mar. 27, 1945 |